(12) United States Patent
Nakamura et al.

(10) Patent No.: US 7,812,275 B2
(45) Date of Patent: Oct. 12, 2010

(54) AUTOMATICALLY RESET SWITCH

(75) Inventors: Takashi Nakamura, Saitama (JP); Hirokazu Nakata, Saitama (JP)

(73) Assignee: Toyo Denso Co., Ltd., Tokyo (JP)

( * ) Notice: Subject to any disclaimer, the term of this patent is extended or adjusted under 35 U.S.C. 154(b) by 518 days.

(21) Appl. No.: 11/889,199

(22) Filed: Aug. 9, 2007

(65) Prior Publication Data
US 2008/0035457 A1    Feb. 14, 2008

(30) Foreign Application Priority Data
Aug. 10, 2006   (JP) ............................. 2006-218366

(51) Int. Cl.
*H01H 21/00*   (2006.01)
(52) U.S. Cl. ...................... 200/553; 200/339
(58) Field of Classification Search ............... 200/6 R, 200/6 A, 329–339, 553–559, 61.54–61.57
See application file for complete search history.

(56) References Cited

U.S. PATENT DOCUMENTS 6,420,669 B1 *   7/2002  Shenker et al. .............. 200/339
7,115,826 B2 *  10/2006  Sasaki ......................... 200/339
7,560,656 B2 *   7/2009  Okatani et al. .............. 200/559
2003/0159912 A1 *  8/2003  Sasaki ......................... 200/553

FOREIGN PATENT DOCUMENTS

JP             323682 A    12/1997

* cited by examiner

Primary Examiner—Renee S Luebke
Assistant Examiner—Marina Fishman
(74) Attorney, Agent, or Firm—Arent Fox LLP

(57) ABSTRACT

A control knob is supported on a switch base via a first pivotal shaft. A movable contact holder holds a movable contact and is supported on the switch base via a second pivotal shaft substantially parallel with the first pivotal shaft. The movable contact holder is formed with first and second arms between which a sliding surface is formed. A control plunger sliding on the sliding surface is slidably fitted to the control knob. A return spring urges the control plunger in a direction to abut on the sliding surface. The control plunger is arranged such that, when the control knob tilts to the first and second operating positions, the tip end of the control plunger moves on the sliding surface to left and right sides with respect to a plane extending between axes of the first and second pivotal shafts, and such that the repulsive force of the return spring constantly urges the control knob toward the first operating position.

3 Claims, 9 Drawing Sheets

STARTER SWITCH TURNED-OFF STATE

FIG.4
STARTER SWITCH TURNED-OFF STATE

STARTER SWITCH TURNED-ON STATE

FIG.9

AUTOMATICALLY RESET SWITCH

CROSS-REFERENCE TO RELATED APPLICATION

This application claims the priority of JP Application No. 2006-218366, filed Aug. 10, 2006, the entire specification claims and drawings of which are incorporated herewith by reference.

BACKGROUND OF THE INVENTION

1. Field of the Invention

The present invention relates to an improvement of an automatically reset switch, comprising: a switch base; a stationary contact fixed to the switch base; a control knob attached to the switch base to be movable between a first operating position and a second operating position; a movable contact holder which moves between first and second actuation positions in associating with the movement of the control knob to the first and second operating positions; a movable contact which is supported by the movable contact holder and comes into contact with the stationary contact when the movable contact holder moves to the second actuation position; and a return urging means provided between the control knob and the switch base so as to urge the control knob toward the first operating position.

2. Description of the Related Art

Such a switch has been already known as disclosed in Japanese Patent Application Laid-open No. 9-323682.

In the conventional automatically reset switch, a movable contact holder is of a sliding type. A click mechanism is provided between a switch base and the movable contact holder in order to give a click feeling to a user so that the user can sense that a movable contact has moved to a second actuation position when the user has turned the control knob into a second operating position. However, this arrangement increases the number of parts, leading to a difficulty in reducing the cost.

SUMMARY OF THE INVENTION

The present invention has been achieved in view of such circumstances, and an object thereof is to provide a automatically reset switch having a small number of parts and a simple structure, in which return urging means of a control knob has a click function so that a user can sense that a movable contact has moved to a second actuation position when the user has operated the control knob to a second operating position, without using a dedicated click mechanism.

To achieve the above-mentioned object, according to a first feature of the invention, there is provided an automatically reset switch, comprising: a switch base; a stationary contact fixed to the switch base; a control knob attached to the switch base to be movable between a first operating position and a second operating position; a movable contact holder which moves between a first and second actuation positions in associating with the movement of the control knob to the first and second operating positions; a movable contact which is supported by the movable contact holder and comes into contact with the stationary contact when the movable contact holder moves to the second actuation position; and a return urging means provided between the control knob and the switch base so as to urge the control knob toward the first operating position, wherein the control knob is supported on the switch base via a first pivotal shaft so as to be tiltable between the first and second operating positions; wherein the movable contact holder holds the movable contact and is supported on the switch base, via a second pivotal shaft substantially parallel with the first pivotal shaft, so as to tilt between the first and second actuation positions; wherein the movable contact holder is formed with first and second arms which project in opposite directions with the second pivotal shaft therebetween; wherein a sliding surface is formed between the first and second arms; wherein the return urging means comprises a control plunger which is slidably fitted to the control knob so as to cause a tip end thereof to slide on the sliding surface corresponding to the tilting of the control knob, and a return spring which urges the control plunger in a direction to abut on the sliding surface; and wherein the control plunger is arranged such that, when the control knob tilts to the first and second operating positions, the tip end of the control plunger moves on the sliding surface to left and right sides with respect to a plane extending between axes of the first and second pivotal shafts, and such that the repulsive force of the return spring constantly urges the control knob toward the first operating position.

With the first feature of the present invention, as the control knob is tilted to the second actuation position, the tip end of the control plunger ascends on the sliding surface toward the above-described plane so that the operating load on the control knob increases; however, when the tip end of the control plunger passes through the plane to the second arm side, and thus the movable contact holder tilts to the second actuation position side, the return spring expands so as to cause the control plunger to follow the sliding surface, thereby rapidly decreasing the operating load on the control knob. In this way, this arrangement provides a rapid change from increase to decrease in the operating load on the control knob, thereby giving a click feeling to an operator through his finger so that he can sense that the movable contact has moved to a second actuation position. That is, the return urging means, namely, the control plunger, the return spring and the sliding surface has a click mechanism, thereby eliminating need of a dedicated click mechanism. Therefore, it is possible to decrease the number of parts to simplify the structure and reduce the cost.

Also at the second actuation position of the movable contact holder, the repulsive force of the return spring acting on the control plunger acts on the control knob as a return force to urging it in the first operating direction. Therefore, when the operating force is released from the control knob, the control knob is returned to the original first operating position by the repulsive force of the return spring, and accordingly the movable contact holder is also returned to the original first actuation position.

Further, in a non-contact state between the stationary contact and the movable contact, only a space exists between the contacts, and thus waterdrops such as rainwater drops cannot reside between the contacts. Therefore, it is possible to avoid a short-circuit failure due to the waterdrops residing between the contacts. In this structure, the gap between the contacts in a non-contact state can be sufficiently decreased as compared with the case of a movable-contact sliding type, thereby downsizing the switch.

According to a second feature of the present invention, in addition to the first feature, a distance over which the tip end of the control plunger moves from the plane to the second arm when the control knob tilts to the second operating position is smaller than a distance over which the tip end of the control plunger moves from the plane to the first arm when the control knob tilts to the first operating position.

With the second feature of the present invention, a moment to tilt the movable contact holder to the second actuation position due to the urging force of the return spring can be suppressed at the second actuation position of the movable contact holder. Therefore, it is possible to facilitate the return of the control knob to the first actuation position by the repulsive force of the return spring.

According to a third feature of the present invention, in addition to the first or second feature, a starting circuit for activating an engine starter motor is connected to the stationary contact; another stationary contact is secured to the switch base, a lighting circuit for lighting a headlamp being connected to the another stationary contact; and another movable contact is attached to the movable contact holder, the another movable contact coming into contact with the another stationary contact upon return of the movable contact holder to the first actuation position.

With the third feature of the present invention, the headlamp is turned on when the control knob is not in operation and is turned off when the control knob is in operation, thereby more reliably activating the engine starter motor.

The above-mentioned object, other objects, characteristics, and advantages of the present invention will become apparent from an explanation of a preferred embodiment, which will be described in detail below by reference to the attached drawings.

DESCRIPTION OF THE PREFERRED EMBODIMENT

Figure 1:
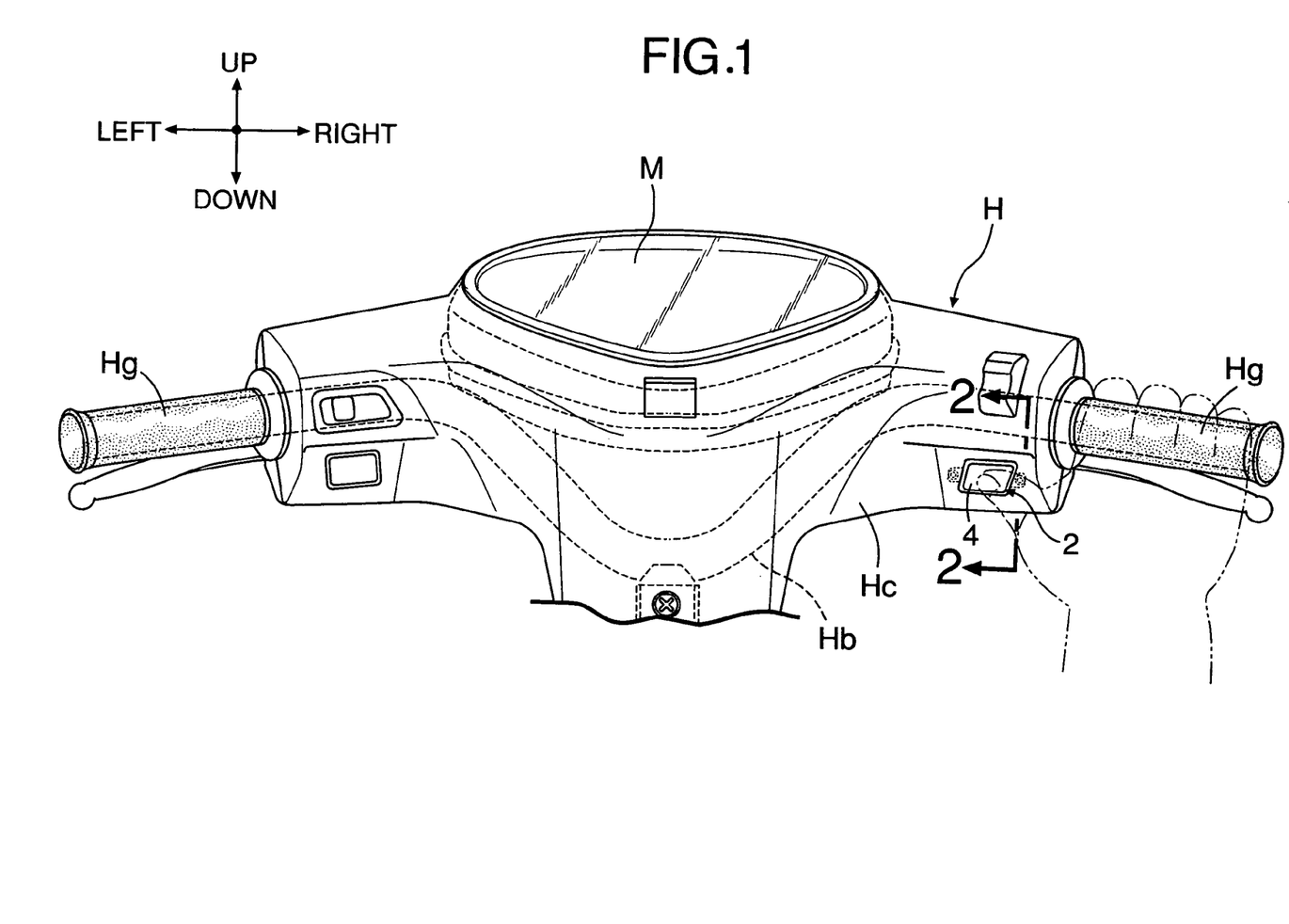
FIG. 1 is a rear view showing a steering handle system for a motorcycle including a starter switch according to an embodiment of the present invention.
Figure 2:
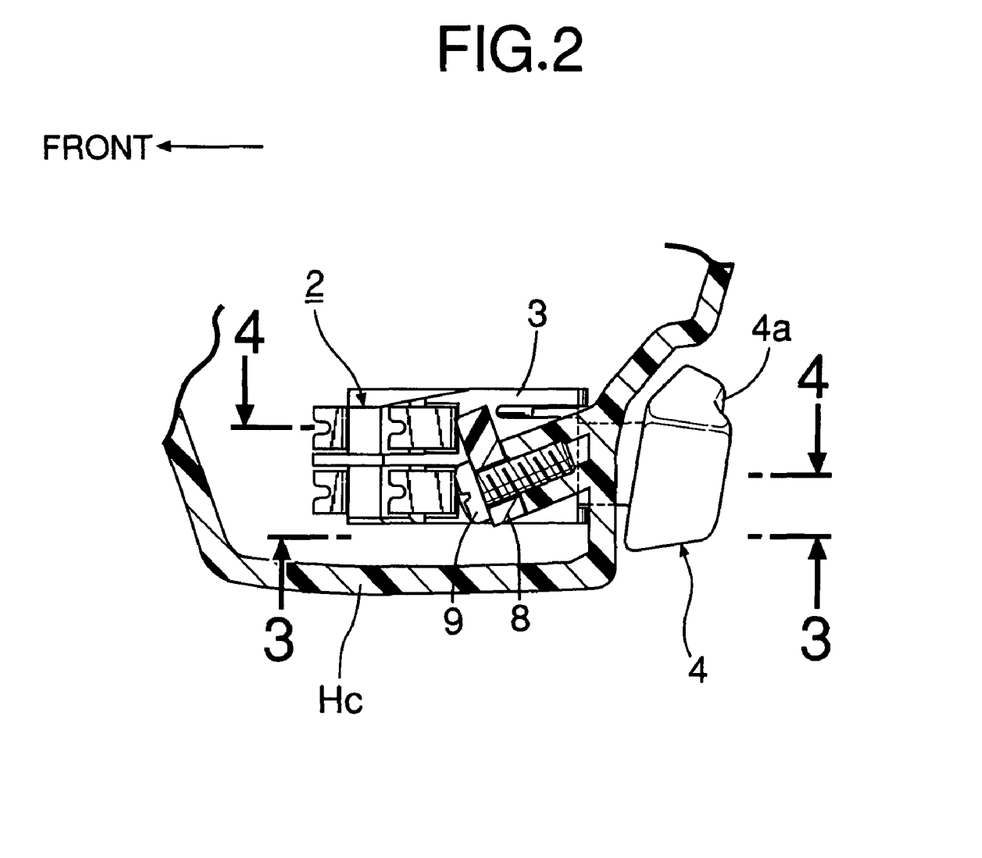
FIG. 2 is a sectional view taken along line 2-2 in FIG. 1.

First, in FIG. 1, a steering handle system H for a motorcycle comprises a handle bar Hb and a handle cover Hc. The handle bar Hb is connected to an upper end of a front fork not shown, and has grips Hg at its opposite end. The handle cover Hc covers an intermediate portion of the handle bar Hb except for the grips Hg. The handle cover Hc is secured by screws to the handle bar Hb at an appropriate position. Various switches are attached to a rear wall, facing the driver, of the handle cover Hc. An engine kill-switch 2 to which the present invention is applied is attached to a right-end lower part of the handle cover Hc. A meter unit M including a combination of various meters is attached to an upper part of the handle cover Hc.

In FIGS. 2 to 6, the starter switch 2 includes major components: a switch base 3; a control knob 4; two pairs of left and right stationary contacts 51, 51; 52, 52; a movable contact holder 6; and first and second movable contacts 71, 72.

The switch base 3 is made of synthetic resin, and has a box shape whose rear face on the operator side is opened. Stays 8, 8 are integrally formed on right and left sidewalls of the switch base 3, and secured to an inner wall of the handle cover Hc with screws 9, 9. A pair of right and left first stationary contacts 51, 51 and a pair of right and left second stationary contacts 52, 52 are provided on a bottom wall 3a of the switch base 3 such that the pairs are spaced away in the right-and-left direction.

Figure 3:
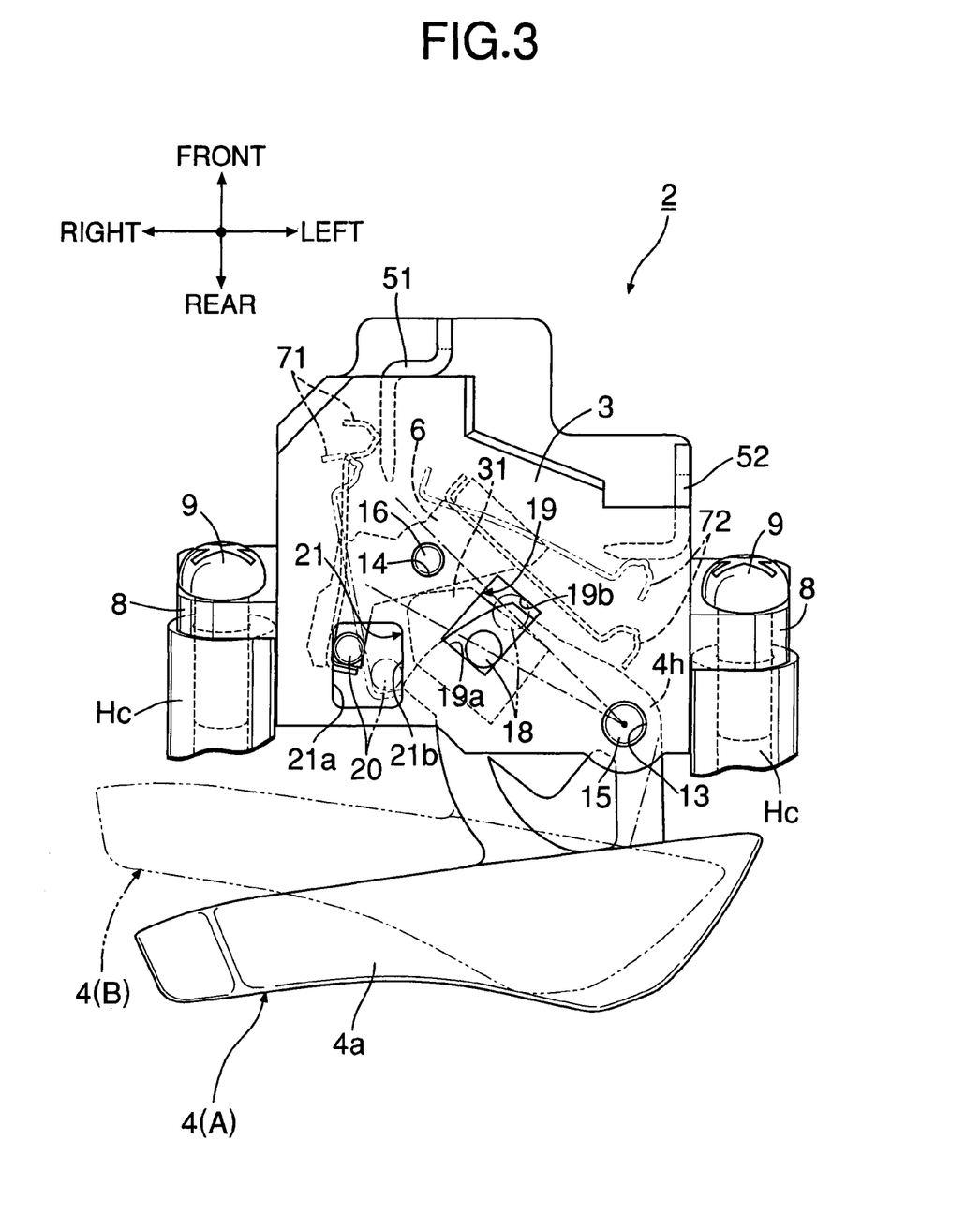
FIG. 3 is a sectional view taken along line 3-3 in FIG. 2.
Figure 5:
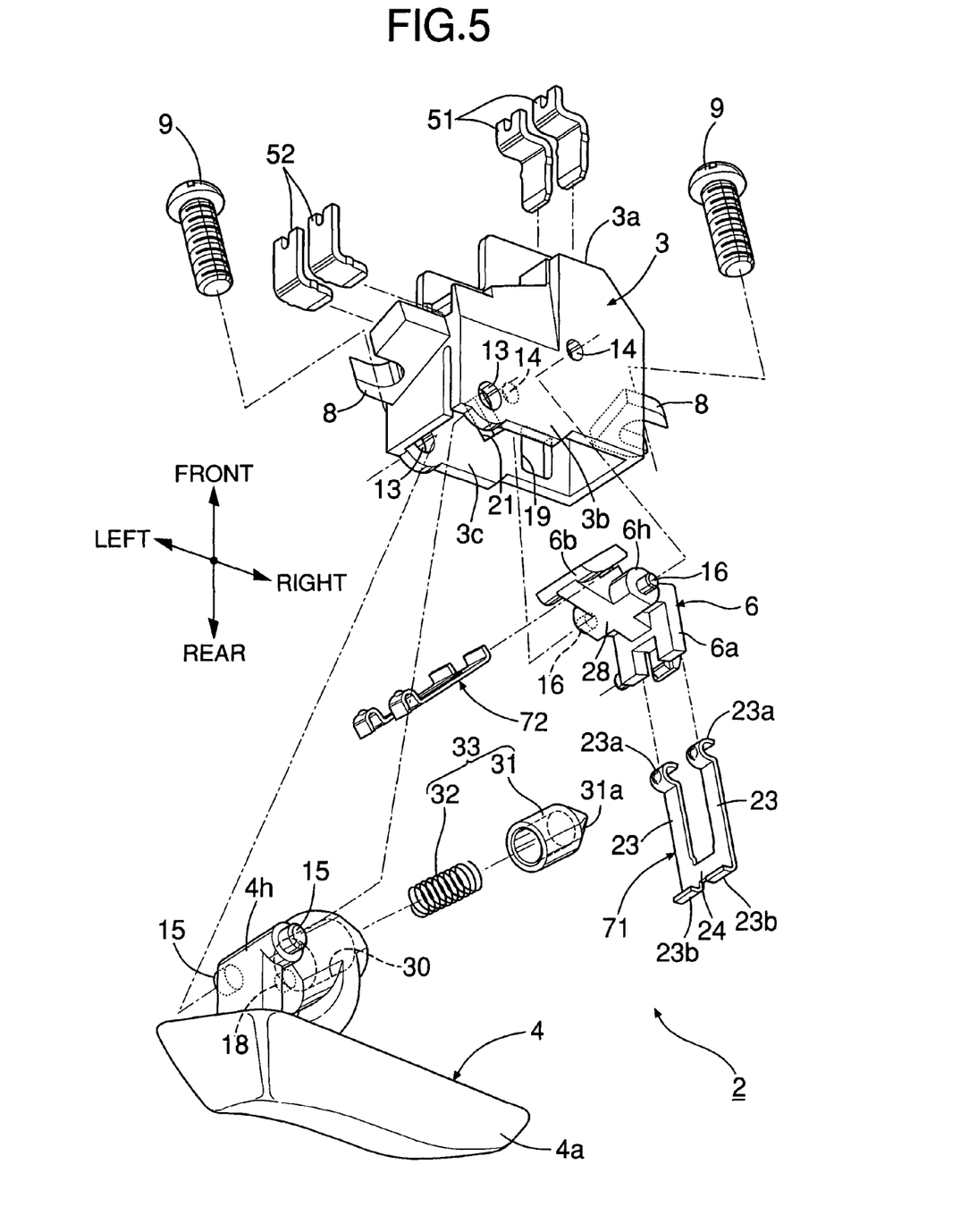
FIG. 5 is an exploded perspective view of the switch.

As shown in FIGS. 3 and 5, a pair of coaxial first shaft support holes 13, 13 aligned in the vertical direction are provided in upper and lower side walls 3b and 3c of the switch base 3 at positions near the open face of the switch base 3. A pair of coaxial second shaft support holes 14, 14 are provided in upper and lower side walls 3b and 3c of the switch base 3 at positions inward of the first shaft support holes 13, 13 and in parallel with the first shaft support holes 13, 13. A pair of first pivotal shafts 15, 15 are projectingly provided on upper and lower side faces of a hub 4h of the control knob 4, and rotatably fitted into the first shaft support holes 13, 13. A pair of second pivotal shafts 16, 16 are projectingly provided on upper and lower side faces of the movable contact holder 6, and rotatably fitted into the second shaft support holes 14, 14.

Figure 6:
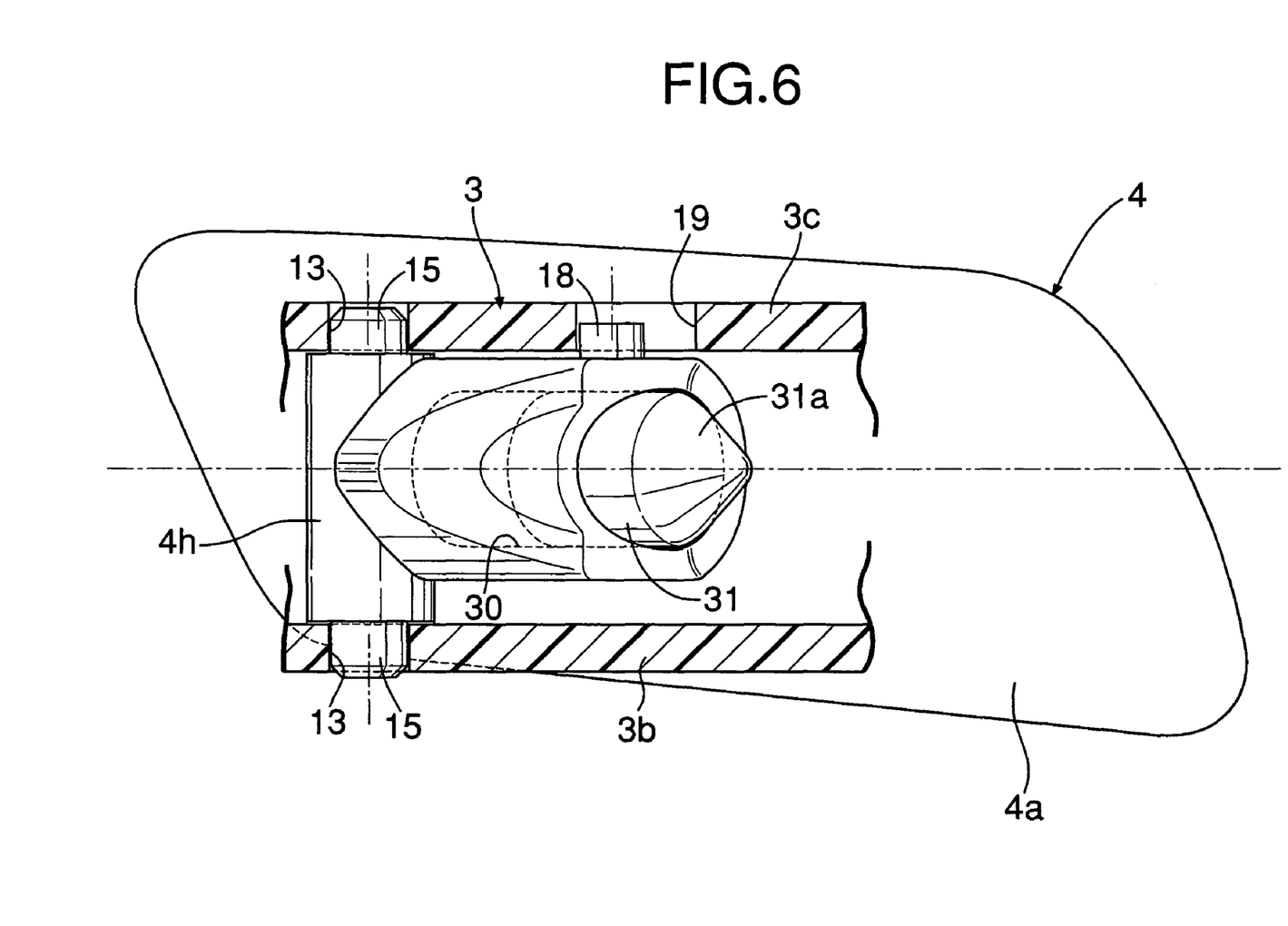
FIG. 6 is a view taken from arrow 6 of FIG. 4.
Figure 7:
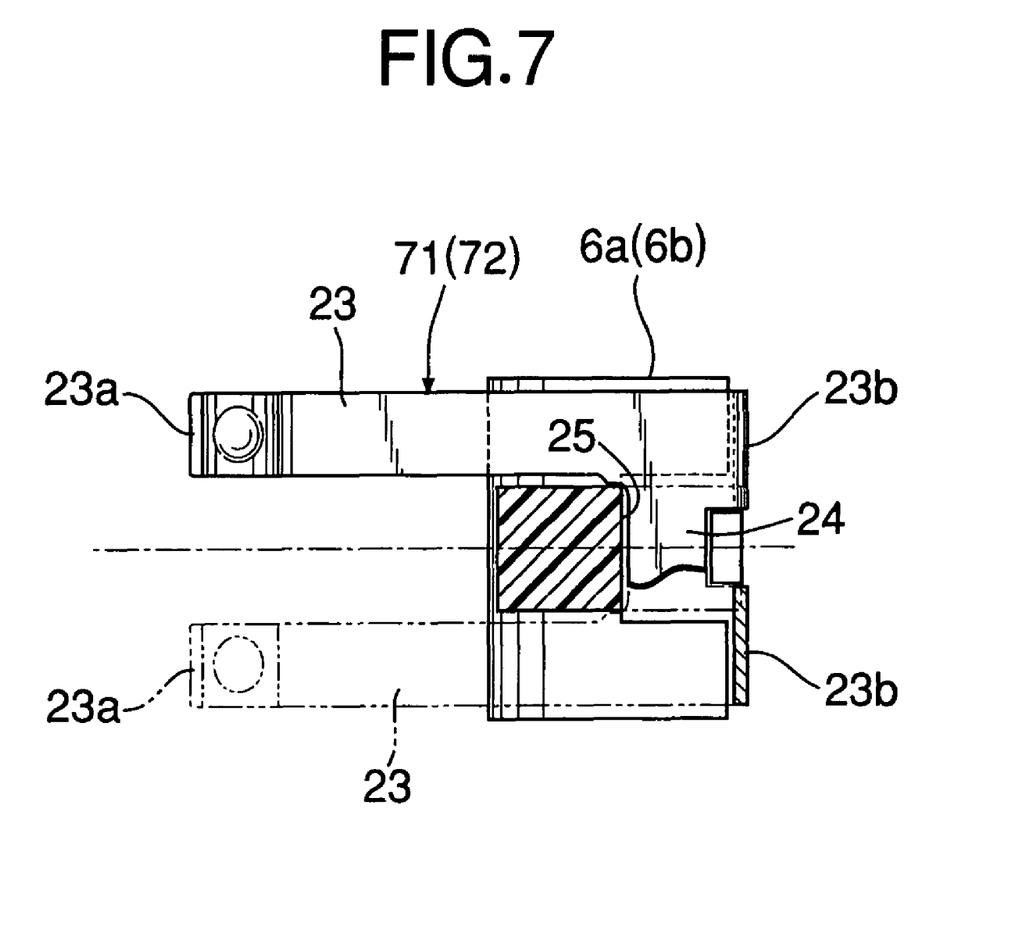
FIG. 7 is a sectional view taken along line 7-7 in FIG. 4.

As shown in FIGS. 3 and 6, the control knob 4 is tiltable about the first pivotal shaft 15, 15 between a first operating position A and a second operating position B. The first and second operating positions A, B are defined by a first stopper pin 18, which projectingly provided on a lower end face of the hub 4h of the control knob 4, alternately abutting on inner walls 19a, 19b of a first defining hole 19 provided in the lower sidewall of the switch base 3. The control knob 4 has a pressing part 4a which is used for tilting the control knob 4 to a second actuation position D.

Figure 8:
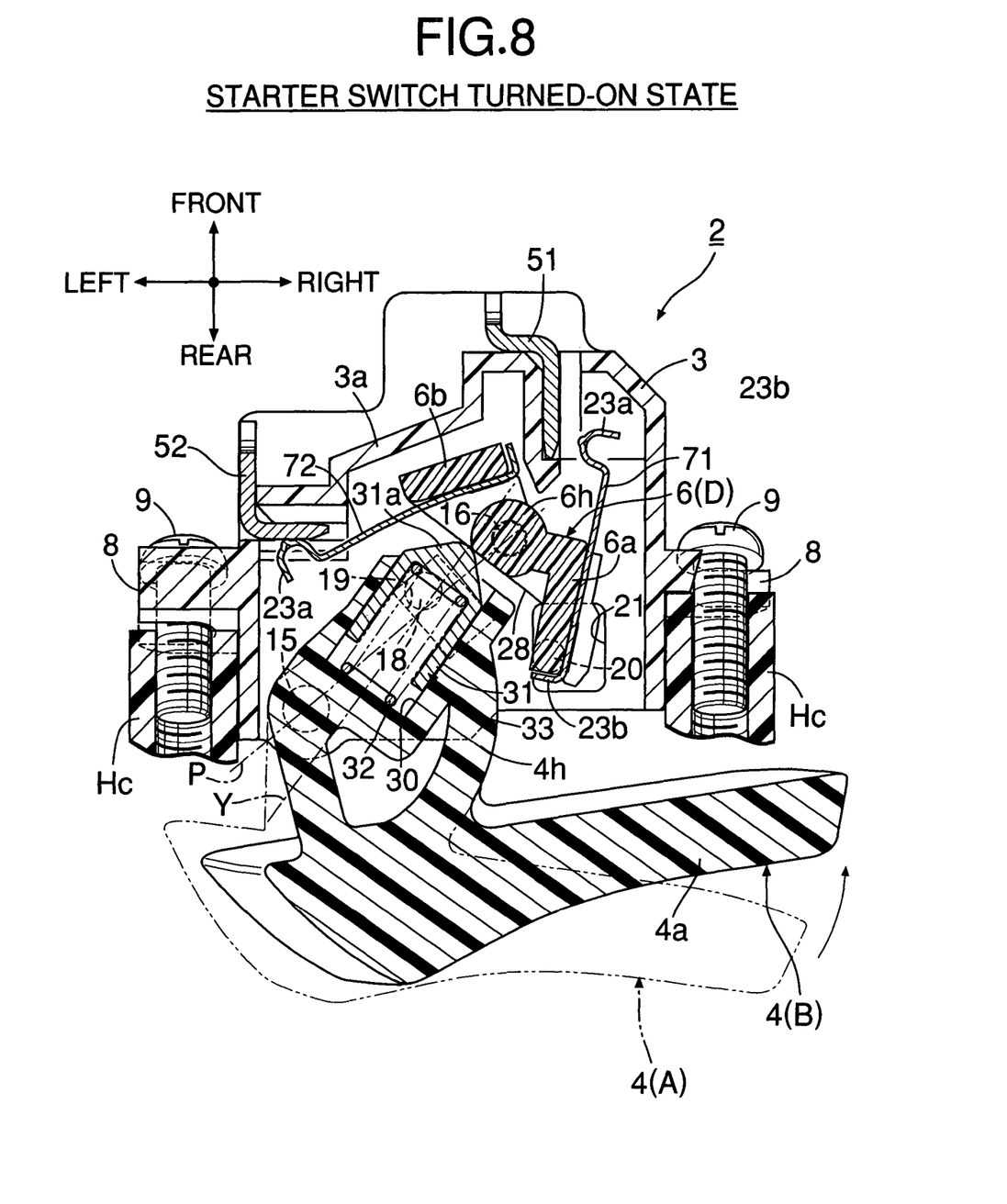
FIG. 8 is a view corresponding to FIG. 4 and showing a turned-on state of the switch.

The movable contact holder 6 can tilt about the second pivotal shaft 16, 16 between a first actuation position C (see FIG. 4) and the second actuation position D (see FIG. 8). The first and second actuation positions C, D are defined by a second stopper pin 20, which is projectingly provided on a lower end face of the movable contact holder 6, alternately abutting on inner walls 21a, 21b of a second defining hole 21 provided in the lower sidewall of the switch base 3.

Figure 4:
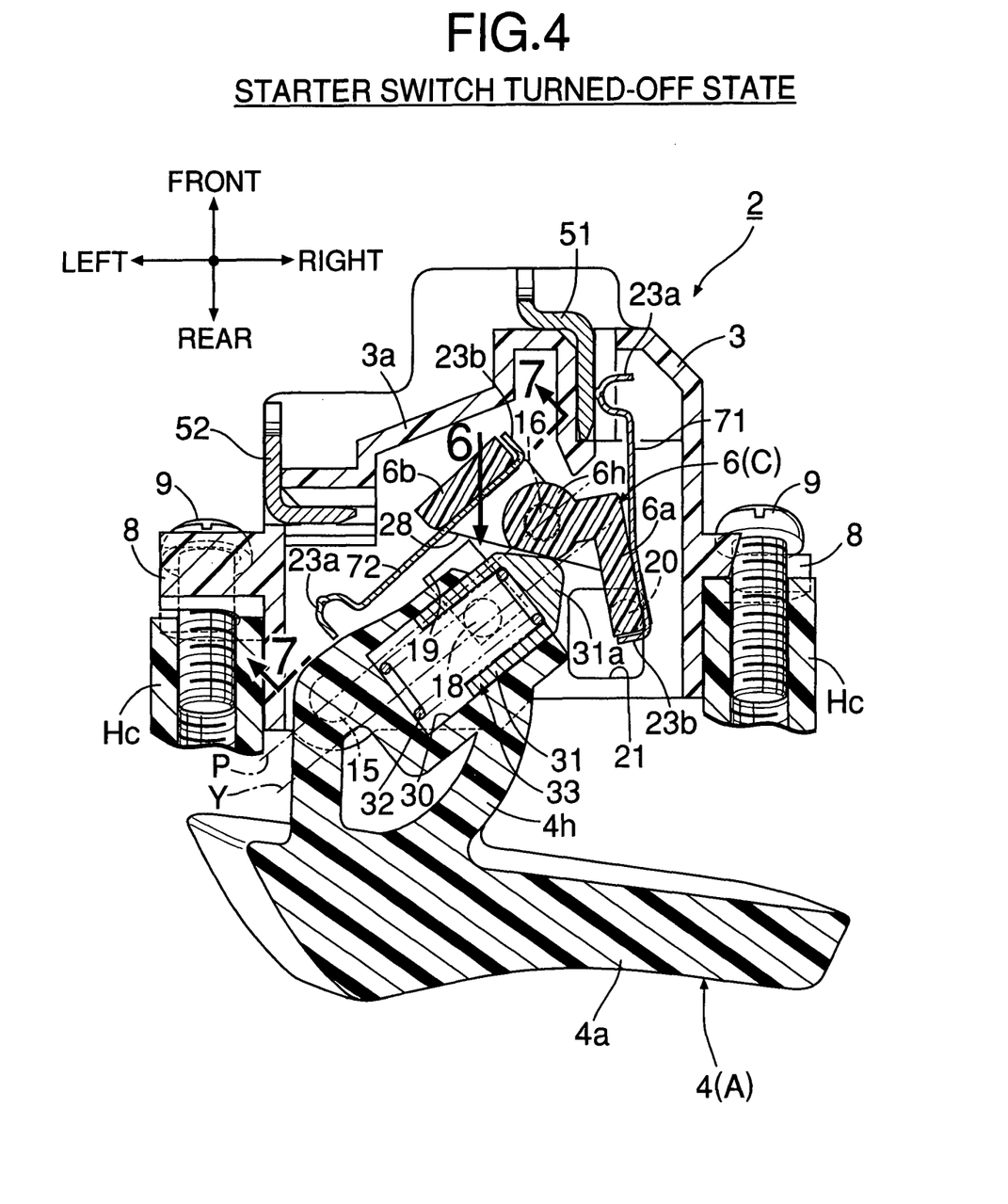
FIG. 4 is a sectional view taken along line 4-4 in FIG. 2, showing a turned-off state of the switch.

As shown in FIGS. 4 and 5, the movable contact holder 6 comprises a hub 6h, and first and second arms 6a and 6b. The hub 6h has second pivotal shafts 16, 16. The first and second arms 6a, 6b protrude from opposite sides of the hub 6h into a V shape in opposite directions from each other. The first arm 6a is provided with a first movable contact 71 corresponding to the first stationary contacts 51, 51. The second arm 6b is provided with a second movable contact 72 corresponding to the second stationary contacts 52, 52.

The first and second movable contacts 71 and 72 has the same structure, each comprising a pair of upper and lower elastic contact pieces 23, 23 and a connecting piece 24 integrally connecting together intermediate portions of the elastic contact pieces 23, 23. U-shaped contact parts 23a, 23a are formed at one ends of the elastic contact pieces 23, 23. Positioning parts 23b, 23b which bends downward are formed at the other ends of the elastic contact pieces 23, 23. The first movable contact 71 is held at a predetermined position in the first arm 6a, by engaging the connecting piece 24 with an engaging groove 25 of the first arm 6a of the movable contact holder 6 and causing the positioning parts 23b, 23b on the end face of the first arm 6a. In the first movable contact 71, when the movable contact holder 6 is at the first actuation position C, the contact parts 23a, 23a are separated from the first stationary contacts 51, 51; and when the movable contact holder 6 is tilted to the second actuation position D, the contact parts 23a, 23a are brought into abutment on the first stationary contacts 51, 51 before the movable contact holder 6 reaches the second actuation position D. Therefore, when the movable contact holder 6 reaches the second actuation position D, the elastic contact pieces 23, 23 are bent because the contact parts 23a, 23a has already abutted on the first stationary contacts 51, 51.

Also, the second movable contact 72 is held at a predetermined position in the second arm 6b in the same manner as in the case of the first movable contact 71. In the second movable contact 72, when the movable contact holder 6 is at the second actuation position D, the contact parts 23a, 23a are separated from the second stationary contacts 53, 53; and when the movable contact holder 6 is tilted to the first actuation position C, the contact parts 23a, 23a are brought into abutment on the second stationary contacts 52, 52 before the movable contact holder 6 reaches the first actuation position C. Therefore, when the movable contact holder 6 reaches the first actuation position C, the elastic contact pieces 23, 23 are bent because the contact parts 23a, 23a are already in abutment on the second stationary contacts 52, 52.

In the movable contact holder 6, a sliding surface 28 is formed from the first arm 6a to the second arm 6b so as to face the control knob 4.

A bottomed guide hole 30 is provided in the hub 4h of the control knob 4 so as to open to the sliding surface 28. A control plunger 31 is fitted into the guide hole 28 so as to cause its tip end 31a to slide on the sliding surface 28. A return spring 32 is housed in the guide hole 28 so as to urge the control plunger 31 in a direction to abut on the sliding surface 28. The tip end 31a of the control plunger 31 is formed into a conical shape having a hemisphere top.

The control plunger 31 is arranged such that an axis Y thereof passes closer to the pressing part 4a of the control knob 4 with respect to the axis of the first pivotal shafts 15, 15. With this arrangement, the repulsive force of the return spring 32 acting on the control plunger 31 serves as a return force for constantly urging the control knob 4 in the first operating direction. Further, the control plunger 31 is arranged such that the tip end 31a of the control plunger 31 moves on the sliding surface 28 to right and left sides with respect to a plane P extending between the axes of the first and second pivotal shafts 15 and 16.

In this structure, it is desirable that a distance over which the tip end 31a of the control plunger 31 moves from the plane P to the second arm 6b side when the control knob 4 is tilted to the second operating position B side is sufficiently smaller than a distance over which the tip end 31a of the control plunger 31 moves from the plane P to the first arm 6a side when the control knob 4 is tilted to the first operating position A side. With this arrangement, it is possible to suppress a moment to tilt the movable contact holder 6 to the second actuation position D due to the urging force of the return spring 32, thereby facilitating the return of the movable contact holder 6 to the first actuation position C by the repulsive force of the return spring 32.

Thus, the control plunger 31 and the return spring 32 cooperate with the sliding surface 28 to constitute return urging means 83, which urges the control knob 4 toward the first operating position A and concurrently urges the movable contact holder 6 toward the first actuation position C.

Figure 9:
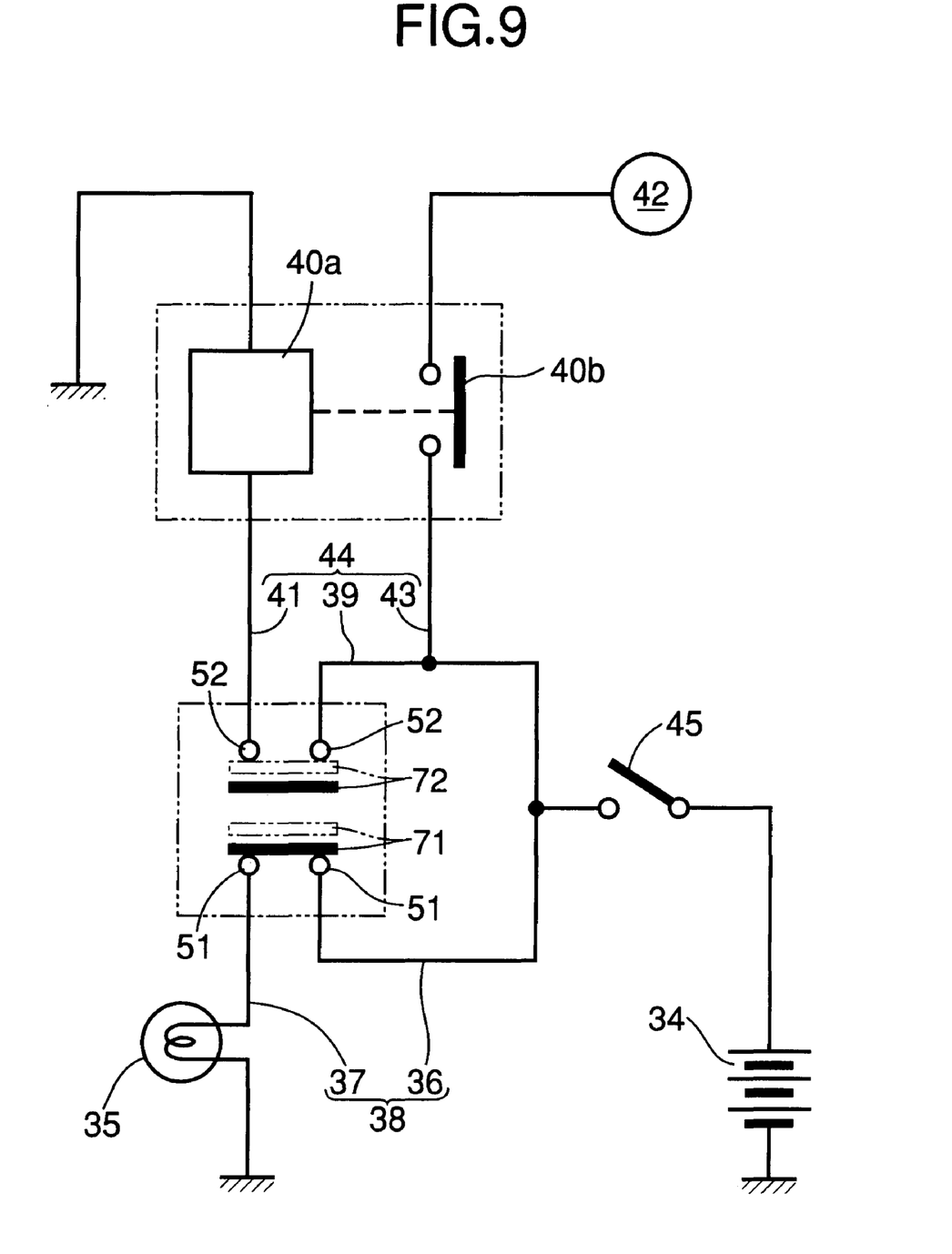
FIG. 9 is a diagram of an electric circuit connected to the switch.

As shown in FIG. 9, a first power supply circuit 36 leading to a battery 34 is connected to one of the first stationary contacts 51, 51, and a first load circuit 37 leading to a headlamp 35 is connected to the other of the first stationary contacts 51, 51. The first power supply circuit 36 and the first load circuit 37 constitute a lighting circuit 38. Therefore, when the first movable contact 71 comes into contact with the first stationary contacts 51, 51, the headlamp 35 is turned on.

Further, a second power supply circuit 39 leading to a battery 34 is connected to one of the second stationary contacts 52, 52, and a relay circuit 41 having a relay coil 40a is connected to the other of the stationary contacts 52, 52. Furthermore, a second load circuit 43 leading to the engine starter motor 42 is connected through a relay contact 40b to the second power supply circuit 39. The second power supply circuit 39, the relay circuit 41 and the second load circuit 43 constitute a starting circuit 44. Therefore, when the second movable contact 72 comes into contact with the second stationary contacts 52, 52, the relay contact 40b is turned on by the excitation of relay coil 40a, thereby activating the starter motor 42. A reference numeral 45 designates a main switch.

Next, the operation of this embodiment will be described.

As shown in FIG. 4, in a non-operation state where the control knob 4 is at the first operating position A, the tip end 31a of the control plunger 31 abuts on the sliding surface 28 on the side of the first arm 6a of the movable contact holder 6 with respect to the plane P extending between the first and second pivotal shafts 15 and 16, and presses the sliding surface 28 with the urging force of the return spring 32. Therefore, the movable contact holder 6 is held at the first actuation position C with the first movable contact 71 in contact with the first stationary contacts 51, 51. Thus, in FIG. 9, when the main switch 45 is turned on, the headlamp 35 is lit. Further, because the repulsive force of the return spring 32 urges the control knob 4 toward the first operating position A, also the control knob 4 is held at the first operating position A.

When the pressing part 4a is pressed and the control knob 4 is tilted to the second operating position B side in order to start the engine of the motorcycle, correspondingly the tip end 31a of the control plunger 31 slides on the sliding surface 28 of the movable contact holder 6 toward the second arm 6b. In this process, as the tip end 31a of the control plunger 31 initially nears the plane P extending between the axes of the first and second pivotal shafts 15 and 16, the control plunger 31 ascends on the sliding surface 28, so that the tip end 31a has no choice but to recede into the guide hole 30. Therefore, as the repulsive force of the return spring 32 increases, the operating load (pressing resistance of the pressing part 4a) on the control knob 4 increases. However, as soon as the tip end 31a of the control plunger 31 crosses the plane P onto the second arm 6b side, the movable contact holder 6 tilts, as shown in FIG. 8, to the second actuation position D to cause the second movable contact 72 to come into contact with the second stationary contact 52, 52. Therefore, it is possible to activate the starter motor 42, as described above, to start the engine of the motorcycle.

On the other hand, the first movable contact 71 is separated from the stationary contacts 51, 51 by the movable contact holder 6 tilting to the second actuation position D, and thus the headlamp 35 is turned off. With this arrangement, the power of the battery 34 is concentrated on the starter motor 42, thereby securing a powerful operation of the starter motor 42.

When the movable contact holder 6 tilts to the second actuation position D by the tip end 31a of the control plunger 31 moving across the plane P toward the second arm 6b, the control plunger 31 increases a amount of protrusion from the guide hole 30 in following the sliding surface 28, and thus the operating force of the control knob 4, that is, the pressing load on the pressing part 4a rapidly decreases due to the expansion of the return spring 32. This rapid change from increase to decrease in the pressing load on the control knob 4a gives a click feeling to the operator who operates the control knob 4a through his finger so that he can sense that the movable contact holder 6 has moved to the second actuation position D. Therefore, upon urging the movable contact holder 6 toward the first actuation position C, a click function is imparted to the return urging means 33, that is, the control plunger 31, the return spring 32 and the sliding surface 28, which urges the control knob 4 to the first operating position A. Therefore, it is possible to eliminate the need of a dedicated click mechanism, thereby decreasing the number of parts to simplify the structure and reduce the cost.

The movable contact holder 6 tilts remarkably fast to the second actuation position D when the tip end 31a of the control plunger 31 crosses the plane P toward the second arm 6a, and the second movable contact 72 is bent in the state of contact with the second stationary contacts 52, 52. Therefore, it is possible to give a strong impact and a friction to the contact portions between the second stationary contact 72 and the second movable contacts 52, 52, thereby effectively removing interjacent objects such as oxide film and dust from between the contact portions, and minimizing generation of sparks. Further, in the state where the movable contact holder 6 is held at the second actuation position C by the pressing force on the pressing part 4a, the second movable contact 72 is bent in the state of contact with the second stationary contact 52, 52. Therefore, the contact pressure between the contacts 52 and 72 is determined not by the pressing force on the pressing part 4a, but by the repulsive force due to the bending of the second movable contacts 72, 72. Thus, it is possible to prevent the contact pressure from becoming excessive, thereby contributing to the improvement of the durability of the contacts 52 and 72.

Also at the second actuation position D of the movable contact holder 6, the repulsive force of the return spring 32 acting on the control plunger 31 acts on the control knob 4 as a return force to urging it in the first operating direction A. Therefore, when the operating force is released from the pressing part 4a of the control knob 4 after start of the engine, the control knob 4 is returned to the original first operating position A by the repulsive force of the return spring 32, and accordingly the tip end 31a of the control plunger 31 moves across the plane P to the first arm 6a side, so that the movable contact holder 6 is also returned to the original first actuation position C. Thus, the second movable contact 72 is separated from the second stationary contacts 52, 52 to terminate the operation of the starter motor 42, while the first movable contact 71 comes into contact with the first stationary contacts 51, 51 to turn on the headlamp 35, thereby avoiding a situation where the rider forgets to turn on the headlamp 35 when the motorcycle is traveling.

In this way, the movable contact holder 6 changes the tilting direction from the second actuation position D to the first actuation position C, and the first movable contact 71 immediately comes into contact with the first stationary contacts 51, 51 and is bent. Therefore, it is possible to give a strong impact and a friction to the contact portions between the first movable contact 71 and the first stationary contacts 51, 51, thereby effectively removing inclusions such as oxides and dusts and minimizing the generation of sparks. Further, in the state where the control plunger 31 holds the movable contact holder 6 at the first actuation position C with the return spring 32, the first movable contact 71 is bent while being in contact with the first stationary contact 51, 51. Therefore, the contact pressure between the contacts 51 and 71 is determined by the repulsive force due to the bending of the first movable contacts 71, 71. Thus, it is possible to prevent the contact pressure from becoming excessive, thereby contributing to the improvement of the durability of the contacts 51 and 71.

Furthermore, in a non-contact state between the stationary contacts 51, 52 and the movable contacts 71, 72, only a space exists between the contacts 51 and 71 as well as between the contacts 52 and 72, and thus waterdrops such as rainwater drops cannot reside therebetween. Therefore, it is possible to avoid a short-circuit failure due to the waterdrops residing between the contacts 51 and 71 as well as between the contacts 52 and 72. In this structure, the gap between the contacts 51 and 71 in a non-contact state can be sufficiently decreased as compared with the case of a movable-contact sliding type, thereby downsizing the switch 2.

The present invention is not limited to the above described embodiment, and changes in design can be made without departing from the subject matter of the present invention. For example, the operating direction of the control knob 4 can be any direction such as leftward and rightward, upward and downward directions in addition to the forward and backward directions. Also, the present invention is applicable to any other automatically reset switch without being limited to the above-described starter switch 2.

What is claimed is:

1. An automatically reset switch, comprising:
   a switch base;
   a stationary contact fixed to the switch base;
   a control knob attached to the switch base to be movable between a first operating position and a second operating position;
   a movable contact holder which moves between first and second actuation positions in associating with the movement of the control knob to the first and second operating positions;
   a movable contact which is supported by the movable contact holder and comes into contact with the stationary contact when the movable contact holder moves to the second actuation position; and
   a return urging means provided between the control knob and the switch base so as to urge the control knob toward the first operating position,
   wherein in that the control knob is supported on the switch base via a first pivotal shaft so as to be tiltable between the first and second operating positions;
   wherein the movable contact holder holds the movable contact and is supported on the switch base, via a second pivotal shaft substantially parallel with the first pivotal shaft, so as to tilt between the first and second actuation positions;
   wherein the movable contact holder is formed with first and second arms which project in opposite directions with the second pivotal shaft therebetween;
   wherein a sliding surface is formed between the first and second arms;
   wherein the return urging means comprises a control plunger which is slidably fitted to the control knob so as to cause a tip end thereof to slide on the sliding surface corresponding to the tilting of the control knob, and a return spring which urges the control plunger in a direction to abut on the sliding surface;
   wherein the control plunger is arranged such that, when the control knob tilts to the first and second operating positions, the tip end of the control plunger moves on the sliding surface to left and right sides with respect to a plane extending between axes of the first and second pivotal shafts, and such that the repulsive force of the return spring constantly urges the control knob toward the first operating position; and
   wherein a distance over which the tip end of the control plunger moves from the plane to the second arm when the control knob tilts to the second operating position is smaller than a distance over which the tip end of the control plunger moves from the plane to the first arm when the control knob tilts to the first operating position.

2. An automatically reset switch, comprising:

a switch base;

a stationary contact fixed to the switch base;

a control knob attached to the switch base to be movable between a first operating position and a second operating position;

a movable contact holder which moves between first and second actuation positions in associating with the movement of the control knob to the first and second operating positions;

a movable contact which is supported by the movable contact holder and comes into contact with the stationary contact when the movable contact holder moves to the second actuation position; and a return urging means provided between the control knob and the switch base so as to urge the control knob toward the first operating position, wherein in that the control knob is supported on the switch base via a first pivotal shaft so as to be tiltable between the first and second operating positions;

wherein the movable contact holder holds the movable contact and is supported on the switch base, via a second pivotal shaft substantially parallel with the first pivotal shaft, so as to tilt between the first and second actuation positions;

wherein the movable contact holder is formed with first and second arms which project in opposite directions with the second pivotal shaft therebetween;

wherein a sliding surface is formed between the first and second arms;

wherein the return urging means comprises a control plunger which is slidably fitted to the control knob so as to cause a tip end thereof to slide on the sliding surface corresponding to the tilting of the control knob, and a return spring which urges the control plunger in a direction to abut on the sliding surface;

wherein the control plunger is arranged such that, when the control knob tilts to the first and second operating positions, the tip end of the control plunger moves on the sliding surface to left and right sides with respect to a plane extending between axes of the first and second pivotal shafts, and such that the repulsive force of the return spring constantly urges the control knob toward the first operating position; and wherein a starting circuit for activating an engine starter motor is connected to the stationary contact; another stationary contact is secured to the switch base, a lighting circuit for lighting a headlamp being connected to the another stationary contact; and another movable contact is attached to the movable contact holder, the another movable contact coming into contact with the another stationary contact upon return of the movable contact holder to the first actuation position.

3. The automatically reset switch according to claim 1, wherein a starting circuit for activating an engine starter motor is connected to the stationary contact; another stationary contact is secured to the switch base, a lighting circuit for lighting a headlamp being connected to the another stationary contact; and another movable contact is attached to the movable contact holder, the another movable contact coming into contact with the another stationary contact upon return of the movable contact holder to the first actuation position.

* * * * *